(12) United States Patent
Sakurai

(10) Patent No.: US 8,593,484 B2
(45) Date of Patent: Nov. 26, 2013

(54) DISPLAY CONTROL APPARATUS AND METHOD, PROGRAM, AND RECORDING MEDIA FOR DISPLAY OF A LIST OF PROGRAM INFORMATION USING THREE AXES

(75) Inventor: Mikiko Sakurai, Tokyo (JP)

(73) Assignee: Sony Corporation (JP)

( * ) Notice: Subject to any disclaimer, the term of this patent is extended or adjusted under 35 U.S.C. 154(b) by 931 days.

(21) Appl. No.: 12/288,472

(22) Filed: Oct. 21, 2008

(65) Prior Publication Data

US 2009/0109224 A1    Apr. 30, 2009

(30) Foreign Application Priority Data

Oct. 26, 2007  (JP) ................ P2007-279130

(51) Int. Cl.
*G09G 5/00*   (2006.01)
(52) U.S. Cl.
USPC .......................................................... 345/619
(58) Field of Classification Search
None
See application file for complete search history.

(56) References Cited

U.S. PATENT DOCUMENTS

| | | | | |
|---|---|---|---|---|
| 5,694,176 | A * | 12/1997 | Bruette et al. | 725/43 |
| 6,253,218 | B1 * | 6/2001 | Aoki et al. | 715/201 |
| 7,665,033 | B2 * | 2/2010 | Byrne et al. | 715/782 |
| 8,069,466 | B2 * | 11/2011 | Shelton et al. | 725/134 |
| 2004/0221307 | A1 * | 11/2004 | Arai et al. | 725/44 |
| 2005/0097603 | A1 * | 5/2005 | Kikinis | 725/44 |
| 2006/0080708 | A1 * | 4/2006 | Miyazawa et al. | 725/39 |
| 2007/0107015 | A1 * | 5/2007 | Kazama et al. | 725/39 |
| 2009/0089834 | A1 * | 4/2009 | Parker et al. | 725/39 |

FOREIGN PATENT DOCUMENTS

| | | |
|---|---|---|
| JP | 10-262192 A | 9/1998 |
| JP | 2001-169197 A | 6/2001 |
| JP | 2002-084469 A | 3/2002 |
| WO | 2007-099803 A1 | 9/2007 |

* cited by examiner

*Primary Examiner* — Daniel Hajnik
*Assistant Examiner* — Anh-Tuan V Nguyen
(74) *Attorney, Agent, or Firm* — Lerner, David, Littenberg, Krumholz & Mentlik, LLP

(57) ABSTRACT

A display control apparatus configured to execute control such that a list of a plurality of programs is displayed, includes a data capturer, a two-dimensional arranger, a setter, and a superimposed-display controller.

7 Claims, 11 Drawing Sheets

FIG. 2
(PRIOR ART)

☐ PROGRAM GUIDE [TERRESTRIAL DIGITAL - TELEVISION]　　TODAY 20(TUE) 21(WED) 22(THU) 23(FRI) 24(SAT) 25(SUN) 26(MON)　　3/19(MON) PM 7

☐ GENRE SEARCH

◁ TODAY AFTERNOON　　3/20(TUE) MORNING　　3/20(TUE) AFTERNOON　　3/21(WED) MORNING

| | | | |
|---|---|---|---|
| ☐ | SEIBU MX TV | ○ 091 THE LEAD | 3/19(MON) PM 7:00 - PM 7:30 |
| ☐ | TV TOTO | ○ 071 YOUR HOME DOCTOR | 3/19(MON) PM 7:00 - PM 7:30 |
| ☐ | MHK EDUCATION | ○ 021 GET TOMORROW | 3/19(MON) PM 7:30 - PM 8:00 |
| ☐ | MHK GENERAL | ○ 011 AGE OF PICKUP | 3/19(MON) PM 7:30 - PM 8:00 |
| ☐ | SEIBU MX TV | ○ 091 TV SUNSET | 3/19(MON) PM 7:45 - PM 8:00 |
| ☐ | TV TOTO | ○ 071 VIDEO WORKSHOP | 3/19(MON) PM 8:48 - PM 8:54 |
| ☐ | TV SUNSET | ○ 051 COUNTRY LIFE | 3/19(MON) PM 8:54 - PM 9:00 |
| ☐ | TV SUNSET | ○ 051 TV DISCUSSION OF BATT TAKASHI | 3/19(MON) PM 9:00 - PM 9:54 |
| ☐ | DAILY TV | ○ 041 GREAT HUNT BY MITA MORIO | 3/19(MON) PM 9:00 - PM11:09 |
| ☐ | TV SUNSET | ○ 051 REPORTAGE SPOT | 3/19(MON) PM 9:54 - PM11:10 |
| ☐ | SEIBU MX TV | ○ 091 FLOWER CALENDER | 3/19(MON) PM 9:55 - PM10:00 |
| ☐ | SEIBU MX TV | ○ 091 TAKANA CLUB | 3/19(MON) PM10:00 - PM10:30 |

☐ NEWS
☐ SPORTS
☐ WIDE SHOW
☐ DRAMA
☐ VARIETY
☐ MOVIE
☐ ANIME
☐ DOCUMENTARY

FIG. 3
(PRIOR ART)

021 [CC] GREEN LIFE "GARDENING GOODS"

041 LIVELY AFTERNOON TV

TERRESTRIAL

TELEVISION 051 THE ROOM OF TETSUO
　　　　　　　　TV SUNSET　　PM 1:20-1:55

061 DRAMA 30 "NOTHING AT ALL"

071 [CC] SPECIAL SHOWPIECE "HOT SPRINGS" [RERUN]

081 QUALIFICATION OF FATHER #57 [CC][S][D]

TELEVISION

X-AXIS (BROADCASTING TIME)

Y-AXIS (REPRESENTATIVE CHANNEL)

Z-AXIS (NON-REPRESENTATIVE CHANNEL)

US 8,593,484 B2

DISPLAY CONTROL APPARATUS AND METHOD, PROGRAM, AND RECORDING MEDIA FOR DISPLAY OF A LIST OF PROGRAM INFORMATION USING THREE AXES

CROSS-REFERENCE TO RELATED APPLICATIONS

The present application claims priority from Japanese Patent Application No. JP 2007-279130, filed in the Japanese Patent Office on Oct. 26, 2007, the entire content of which is incorporated herein by reference.

BACKGROUND OF THE INVENTION

1. Field of the Invention

The present invention relates to a display control apparatus and method, a program, and a recording media and, more particularly, to a display control apparatus and method, a program, and a recording media that are configured to provide an easy-to-understand and easy-to-operation GUI (Graphical User Interface).

2. Description of the Related Art

The increasing prevalence of digital broadcasting has been increasing the chances of displaying program guides, such as EPG (Electronic Program Guide), on television receivers and so on.

Related-art application programs configured to display program guides or related-art application programs configured to display programs retrieved with predetermined conditions display program guides (channel axis and time axis) and search results (channel axis and genre axis) by use of a two-dimensional GUI, for example. In general, a program guide is represented by a vertical axis of time and a horizontal axis of broadcasting channel and a search result is represented by a vertical axis of time and a horizontal axis of genre, for example.

Referring to FIG. 1, there is shown an exemplary related-art program guide. As shown, the vertical axis of the program guide is indicative of broadcasting times while the horizontal axis is indicative of channels.

Referring to FIG. 2, there is shown another exemplary related-art program guide. In this example, the vertical axis of the program guide is indicative of broadcasting time and channel while the horizontal axis is indicative of broadcasting dates.

If two or more short-time programs are broadcast, the short time program guide to be first broadcast among continuous short-time program guides is displayed, below which a "more" marker indicative there exists two or more short-time program guides. When the cursor is positioned at the "more" marker, the short-time program guide to be broadcast next is displayed, followed by the switching between display operations along the broadcasting time as the cursor key is operated (refer to Japanese Patent Laid-open No. Hei 10-262192 for example).

Further, a GUI indicative of content categories is proposed in which the selection of content is made by category, such as recorded content, terrestrial broadcast content, and satellite broadcast content, for example. FIG. 3 shows an exemplary related-art GUI for letting a user select content by category, in which the X-axis represents category and the Y-axis represents channel.

SUMMARY OF THE INVENTION

With the above-mentioned related technologies, if the information of programs to be displayed increases, the vertical axis or horizontal axis of a program guide that is displayed in a two-dimensional manner may be excessively extended. If this happens, the user must scroll the screen in the excessively extended direction to get a grasp of the contents of a program, thereby deteriorating the ease of use.

For example, the diffusion of digital broadcasting increases the number of broadcasting channels. Besides, there are many programs that are broadcast in the midnight time zone, thereby requiring program guides and search results to be wide in display time zone. This excessively extends the vertical axis and the horizontal axis of each program guide and search result on the display screen, thereby impairing the ease of use.

Also, program guide display methods in related art are available in which only a representative channel is displayed so as to decrease the number of channels to be displayed or channels other than a representative channel are displayed smaller. However, these related-art methods present problems in ease of operation that an operation is required to for displaying channels other than a representative channel and the sense of unnaturalness occurs in focus moving speed because the moving focus touches every small channel icon.

Therefore, the present invention addresses the above-identified and other problems associated with related-art methods and apparatuses and solves the addressed problems by providing a display control apparatus and method configured to provide a GUI that is easy for the user to understand and use.

In carrying out the invention and according to one aspect thereof, there is provided a display control apparatus configured to execute control such that a list of a plurality of programs is displayed. This display control apparatus has data capturing means for capturing data including information about a program to be displayed; two-dimensional arranging means for arranging the plurality of programs on two dimensions on the basis of data captured by the data capturer; and setting means for setting an axis different from two axes constituting the two dimensions. This display control apparatus further has superimposed-display controlling means for generating display data for displaying information about programs, among the plurality of programs arranged by the two-dimensional arranger, with each of which a value corresponding to one of the two axes constituting the two dimensions is substantially identical to a corresponding value of another of the programs and a value corresponding to the other axis satisfies a predetermined condition, the information being displayed in a superimposed manner along the different third axis set by the setter.

In the above-mentioned display control apparatus, one of the two axes constituting the two dimensions is indicative of a broadcasting station while the other is indicative of a broadcasting time and the superimposed-display controlling means generates display data for displaying a program to be broadcast on a representative channel and programs to be broadcast on non-representative channels of a same broadcasting station at a same broadcasting time onto a screen in a superimposed manner.

In the above-mentioned display control apparatus, one of the two axes of the two dimensions is indicative of a channel while the other is indicative of a broadcasting time and the superimposed-display controlling means generates display data for displaying a program to be broadcast on a predetermined day and programs to be broadcast on different days on a same channel onto a screen in a superimposed manner.

In the above-mentioned display control apparatus, one of the two axes of the two dimensions is indicative of a channel while the other is indicative of a broadcasting time and the superimposed-display controlling means generates display data for displaying a program to be broadcast in a predetermined week and programs to be broadcast in different weeks on a same channel onto a screen in a superimposed manner.

The above-mentioned display control apparatus further has operating means for changing a display position in a depth direction on a screen on which the programs are displayed in a superimposed manner.

In carrying out the invention and according to another aspect thereof, there is provided a display method configured to display a list of a plurality of programs onto a display screen. This display method has the steps of capturing data including information about a program to be displayed; arranging the plurality of programs on two dimensions on the basis of captured data; and setting an axis different from two axes constituting the two dimensions. This display method further has the step of generating display data for displaying information about programs, among the plurality of programs arranged by the two-dimensional arranging means, with each of which a value corresponding to one of the two axes constituting the two dimensions is substantially identical to a corresponding value of another of the programs and a value corresponding to the other axis satisfies a predetermined condition, the information being displayed in a superimposed manner along the set different third axis.

In carrying out the invention and according to still another aspect thereof, there is provided a program for making a computer be executed as a display control apparatus configured to execute control such that a list of a plurality of programs is displayed. This program has the steps of capturing data including information about a program to be displayed; arranging the plurality of programs on two dimensions on the basis of captured data; and setting an axis different from two axes constituting the two dimensions. This program further has the step of generating display data for displaying information about programs, among the plurality of programs arranged by the two-dimensional arranging means, with each of which a value corresponding to one of the two axes constituting the two dimensions is substantially identical to a corresponding value of another of the programs and a value corresponding to the other axis satisfies a predetermined condition, the information being displayed in a superimposed manner along the set different third axis.

In one aspect of the present invention, data including the information about each program to be displayed is obtained. On the basis of the obtained data, two or more programs are arranged in a two-dimensional manner. Among these arranged two or more programs, each program in which a value corresponding to one of two axes making up the two dimensions is identical to a corresponding value of another of the programs and a value corresponding to the other axis satisfies a predetermined condition, the information being displayed in a superimposed manner along the set different third axis.

As described and according to embodiments of the present invention, a GUI that is significantly easy to understand and use for a user is provided.

BRIEF DESCRIPTION OF THE DRAWINGS

FIG. 2 is a diagram illustrating another exemplary display image of a related-art program guide;

FIG. 3 is a diagram illustrating an exemplary display example of a related-art GUI;

DETAILED DESCRIPTION OF THE PREFERRED EMBODIMENTS

Figure 1:
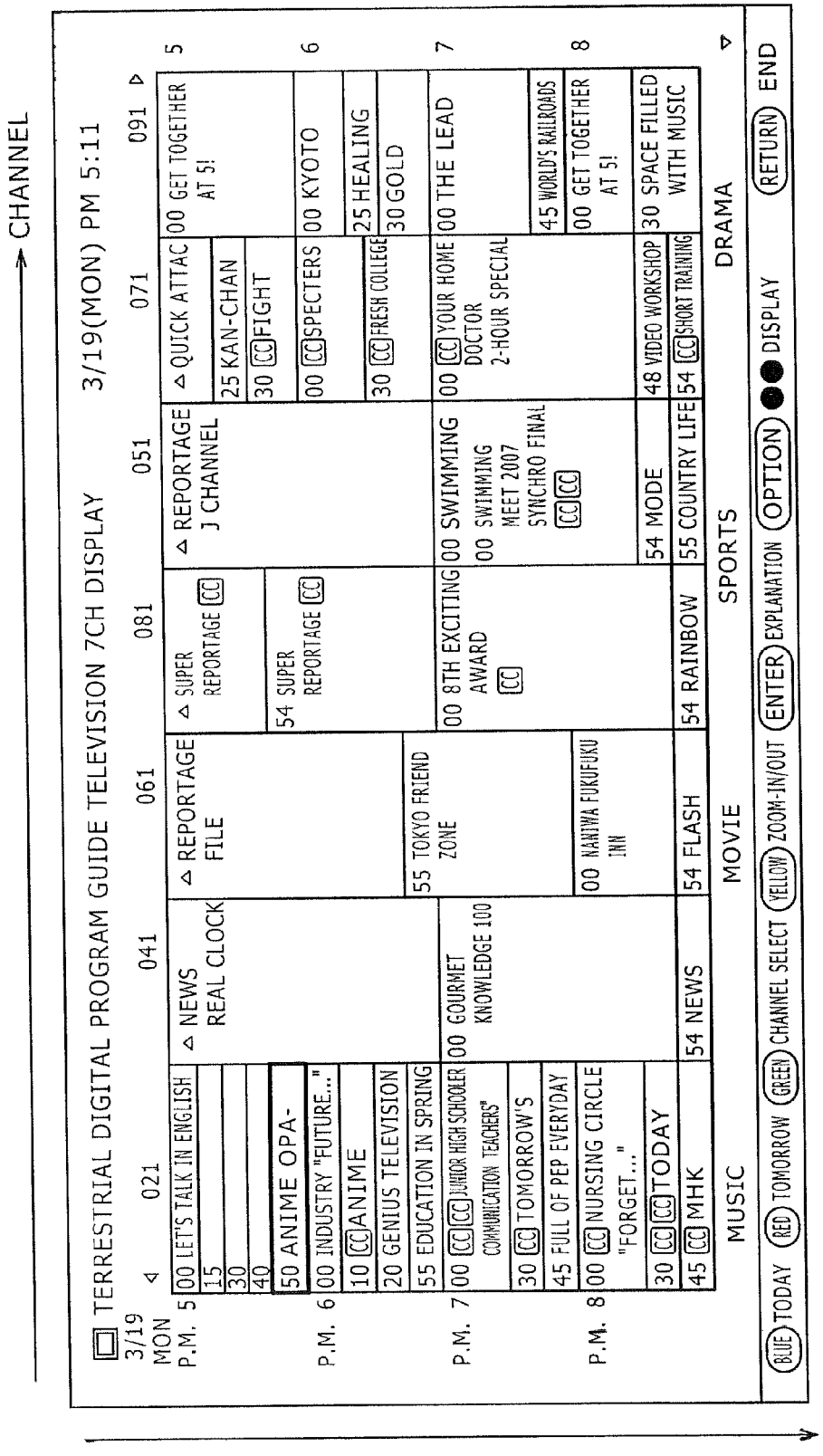
FIG. 1 is a diagram illustrating an exemplary display image of a related-art program guide.

This invention will be described in further detail by way of example with reference to the accompanying drawings. The invention described herein and the embodiments thereof have the following correlation. The description hereof is intended to make sure of the fact that the embodiments supporting the invention described herein are described herein. Therefore, if there is any embodiment that, although described in the description of the preferred embodiment, is not described herein as corresponding to the invention, this does not denote in any manner that such an embodiment does not corresponding to the present invention. Conversely, if any embodiment is described herein as corresponding to the invention, it does not denote in any manner that such an embodiment does not corresponding to other inventions than the present invention.

A display control apparatus configured to execute control such that a list of a plurality of programs is displayed, includes: data capturing means (a date capturing unit 71 in FIG. 5, for example) for capturing data including information about a program to be displayed; two-dimensional arranging means (a processing executing unit 72 in FIG. 5, for example) for arranging the plurality of programs on two dimensions on the basis of data captured by the data capturing means; and setting means (a 3D display converting unit 74 in FIG. 5, for example) for setting an axis different from two axes constituting the two dimensions. The display control apparatus further includes superimposed-display control means (a display date generating unit 75 in FIG. 5, for example) for generating display data for displaying information about programs, among the plurality of programs arranged by the two-dimensional arranging means, with each of which a value corresponding to one of the two axes constituting the two dimensions is substantially identical to a corresponding value of another of the programs and a value corresponding to the other axis satisfies a predetermined condition, the information being displayed in a superimposed manner along the different third axis set by the setting means.

The display control apparatus according to claim 1, further includes an operator configured to change a display position in a depth direction on a screen on which the programs are displayed in a superimposed manner.

A display method configured to display a list of a plurality of programs onto a display screen, includes the steps of: capturing (step S11 in FIG. 10 or step S 31 in FIG. 11, for example) data including information about a program to be displayed; arranging (step S12 in FIG. 10 or step S 34 in FIG. 11 for example) the plurality of programs on two dimensions on the basis of captured data; and setting (step S17 in FIG. 10 or step S 37 in FIG. 11, for example) an axis different from two axes constituting the two dimensions. The display method further includes the step of generating (step S18 in FIG. 10 or step S38 in FIG. 11, for example) display data for displaying information about programs, among the plurality of programs arranged by the two-dimensional arranger, with each of which a value corresponding to one of the two axes constituting the two dimensions is substantially identical to a corresponding value of another of the programs and a value corresponding to the other axis satisfies a predetermined condition, the information being displayed in a superimposed manner along the set different third axis.

This invention will be described in further detail by way of embodiments thereof with reference to the accompanying drawings.

Figure 4:
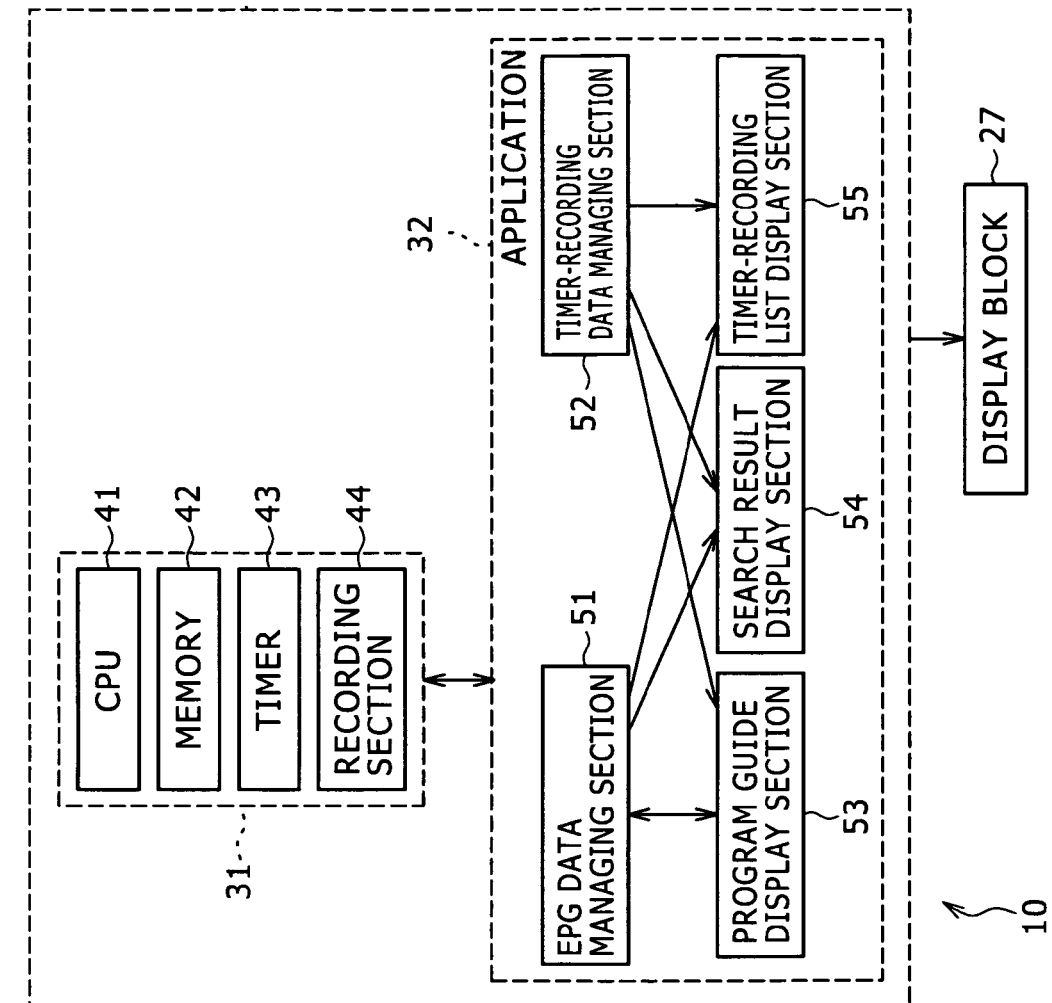
FIG. 4 is a block diagram illustrating an exemplary configuration of a content processing apparatus practiced as one embodiment of the invention.

Now, referring to FIG. 4, there is shown a block diagram illustrating an exemplary configuration of a content processing apparatus practiced as one embodiment of the invention.

This content processing apparatus 10 is configured to receive the data of broadcast content, display the image of the received content, and output the sound of the received content as required. In addition, the content processing apparatus 10 is configured to receive the data, such as a broadcast EPG (Electronic Program Guide) to display a program guide and a list of recorded content. The content processing apparatus 10 is configured as an HDD (Hard Disk Drive), for example.

A signal of the data of broadcast content or an EPG is received by a tuner 22 via an antenna 21. The data signal received by the tuner 22 is demodulated by a demodulating block 23 to be outputted to a control block 26.

The control block 26 has a board 31. The board 31 has a CPU (Central Processing Unit) 41, a memory 42, a RAM (Random Access Memory) and a ROM (Read Only Memory) generically referred to as a memory 42, a timer 43 for clocking time, and a recording section 44 made up of a HDD.

An application program 32 is executed by the CPU 41 of the control block 26. The application program 32 is functionally configured by an EPG data managing section 51, a timer-recording data managing section 52, a program guide display section 53, a search result display section 54, and a timer-recording list display section 55, as shown in FIG. 4.

The EPG data managing section 51 is configured to record received EPG data to the memory 42 or the recording section 44 and read EPG data from the memory 42 or the recording section 44 as required.

The timer-recording data managing section 52 is configured to record data about content timer-viewing or content timer-recording to the memory 42 or the recording section 44 or read data about content timer-viewing or timer-recording from the memory 42 or the recording section 44 as required on the basis of a command issued by the user.

The program guide display section 53, the search result display section 54, and timer-recording list display section 55 are configured to generate display data for displaying a program guide, a search result of content and so on, and a list of timer-viewing or timer-recording, respectively, onto the display block 27 on the basis of information supplied from the EPG data managing section 51 or the timer-recording data managing section 52.

An operator block 24 has a keyboard, a touch panel, and so on and supplies signals corresponding to commands issued by the user to the control block 26.

A remote control receiving block 25 is configured to receive an infrared ray signal transmitted from a remote controller (or a remote commander) operated by the user, demodulates the received signal, and supplies a resultant signal corresponding to a user command to the control block 26.

A display block 27 is made up of an LCD (Liquid Crystal Display) device for example and displays images under the control of the control block 26.

Figure 5:
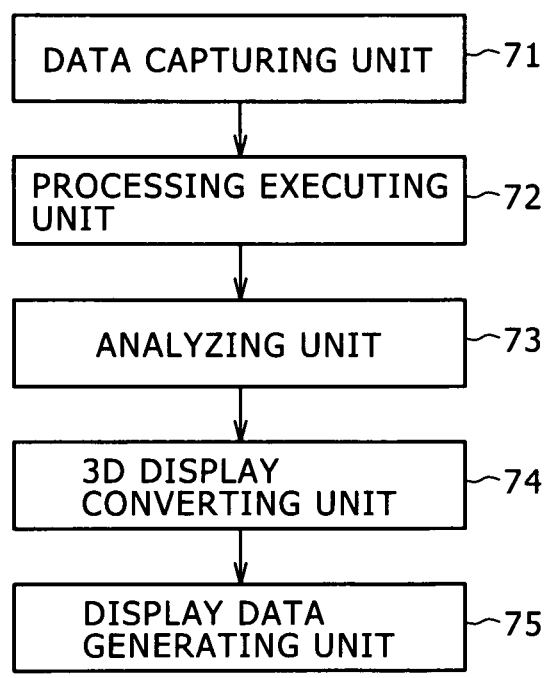
FIG. 5 is a block diagram illustrating a detail exemplary configuration of a program guide display section, a search result display section, and a timer-recording list display section of an application program shown in FIG. 4.

Referring to FIG. 5, there is shown a block diagram illustrating detail exemplary configurations of the program guide display section 53, the search result display section 54, and the timer-recording list display section 55 of the application program 32 shown in FIG. 4.

In FIG. 5, a data capturing unit 71 is configured to capture necessary data from the EPG data managing section 51 and the timer-recording data managing section 52. The captured data is processed by a processing executing unit 72 in a predetermined manner.

The processing executing unit 72 is a functional block configured to execute different processing operations in the program guide display section 53, the search result display section 54, and the timer-recording list display section 55. For example, the processing executing unit 72 of the program guide display section 53 executes the processing necessary for generating a program guide to be presented to the user, the processing executing unit 72 of the search result display section 54 executes the processing necessary for generating a list of search results by searching for the content that matches a predetermined condition, and the processing executing unit 72 of the timer-recording list display section 55 executes the processing necessary for generating a list of timer-viewing or timer-recording to be presented to the user.

An analyzing unit 73 analyzes the data processed by the processing executing unit 72 and outputted therefrom. The analyzing unit 73 identifies information, such as content broadcasting start time and end time and content broadcasting channel for example included in the data outputted from the processing executing unit 72 and determines whether the identified information matches a predetermined condition, supplying analysis results to a 3D (three-dimensional) display converting unit 74 as data.

The 3D display converting unit 74 executes the processing of displaying a program guide, search results of content and so on, or a list of timer-viewing or timer-recording onto a screen in three-dimensional effects on the basis of the data supplied from the analyzing unit 73.

A display data generating unit 75 generates display data of a screen to be displayed on the display block 27 on the basis of the data supplied from the 3D display converting unit 74.

Figure 6:
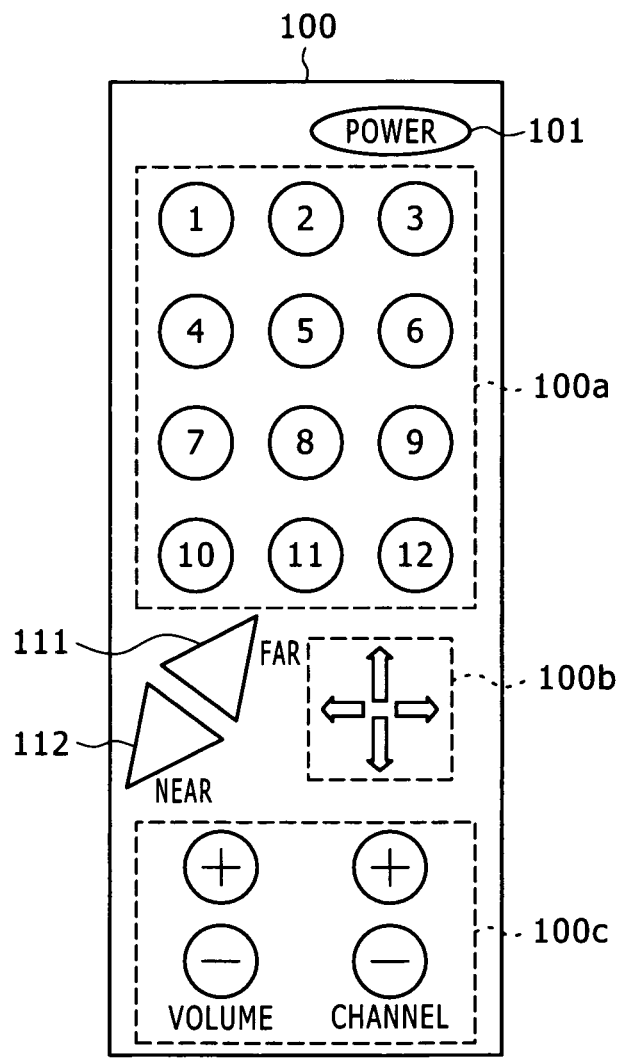
FIG. 6 is a schematic diagram illustrating a remote controller for use in the operation of the content processing apparatus shown in FIG. 4.

Referring to FIG. 6, there is shown a remote controller configured to remotely operate the content processing apparatus 10 shown in FIG. 4. In the figure the operating side of a remote controller 100 is shown.

When a button arranged on the operating side is pressed, the remote controller 100 generates a digital signal of the data of a command corresponding to the pressed button and transmits the generated digital signal to the content processing apparatus 10 in the form of an infrared ray signal modulated in a predetermined modulating scheme.

As shown, the remote controller 100 has a power button 101, which is pressed to transmit a power-on command signal or a power-off command signal to power on or off the content processing apparatus 10.

An area 100a on the operating side of the remote controller 100 is arranged with circular buttons corresponding to numbers 1 through 12. Pressing any one of these buttons transmits a command signal to select a corresponding channel on the content processing apparatus 10, for example.

An area 100b on the operating side of the remote controller 100 is arranged with arrow-shaped buttons indicative of up and down and left and right directions. When any one of these buttons is pressed, a corresponding command signal is transmitted, a cursor or a pointer moves in the corresponding direction on a screen displaying a program guide, search results of content and so on, a list of timer-viewing or timer-recording, or other GUIs, for example.

An area 100c on the operating side of the remote controller 100 is arranged with circular buttons indicated with "+" and "−" symbols. When any one of these buttons is pressed, a corresponding command signal is transmitted such that the volume of sound to be outputted or channel selection is changed.

In addition, the operating side of the remote controller 100 is arranged with a triangular button 111 with an apex angle thereof directed upper right and a triangular button 112 with an apex angle thereof direction lower left. These buttons 111 and 112 are mainly used to display a program guide, search results of content and so on, and a list of timer-viewing or timer-recording in a three-dimensional manner as will be described later. It should be noted that, although a program guide, search results of content and so on, and a list of timer-viewing or timer-recording is normally displayed in a two-dimensional manner, these can also be displayed as if in a three-dimensional manner by the processing by the 3D display converting unit 74. In what follows, displaying of images as if in a three-dimension will be referred to as three-dimensional (3D) display.

When the button 111 is pressed, a corresponding command signal is transmitted from the remote controller to move the cursor or the pointer in the depth direction in a three-dimensionally displayed program guide for example. When the button 11z is pressed, a corresponding command signal is transmitted from the remote controller to move the cursor or the pointer in the direction toward the operator side in a three-dimensionally displayed program guide for example.

Figure 7:
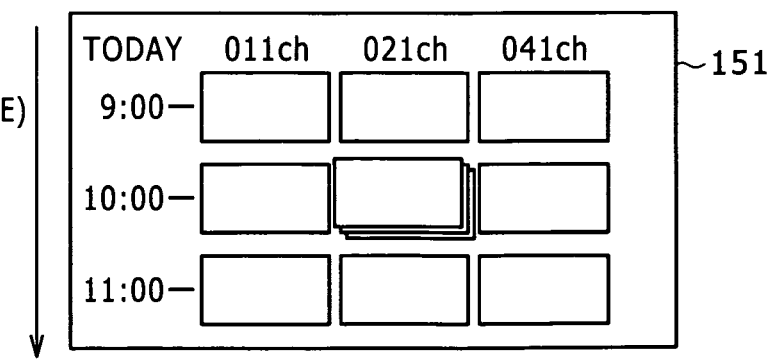
FIG. 7 is a diagram illustrating an exemplary display image of a screen to be displayed when a program guide is displayed in a three-dimensional manner.

Referring to FIG. 7, there is shown a screen display example a program guide in three-dimensional display. FIG. 7 shows an example in which a program of a representative channel of a same broadcasting station to be broadcast in a same time zone is displayed as superimposed with programs of channels other than the representative channel.

If FIG. 7, the up and down direction is indicated by X-axis, the horizontal direction is indicated by Y-axis, and the depth direction is indicated by Z-axis. In the example shown, X-axis is indicative of broadcasting time, Y-axis is indicative of a representative channel of a broadcasting station, and Z-axis is indicative of non-representative channel of each broadcasting station.

A plurality of rectangular boxes displayed in a screen 151 in FIG. 7 display programs titles and so on. To be more specific, these rectangular boxes are indicative of boxes for displaying programs; for example, the display box in a upper left corner the title and other information of a program that is broadcast on channel "011" from 9:00 today.

In the screen 151 shown in FIG. 7, display boxes of programs to be broadcast from 10:00 today, the second row from top and the second column from the left are displayed in the Z-axis direction as stacked. In the state shown in FIG. 7, the display boxes, the second row from top and the second column from the left, show the boxes of programs to be broadcast from 10:00 on a representative channel (namely, channel "021ch" corresponding to channel "021ch."

For example, when the cursor is moved to a position defined by "10:00" of X-axis and "021ch" of Y-axis by pressing the corresponding button arranged in the area 100b of the remote controller 100 and then the button 111 of the remote controller 100 is pressed in this state, the display boxes of programs to be broadcast from 10:00 on channel "022ch" that is not the representative channel of that broadcasting station are displayed at the position of the second row from top and the second column from the left. Further, when the button 111 of the remote controller 100 is pressed, the display boxes of programs to be broadcast from 10:00 on channel "023ch" that is not the representative channel are displayed.

When the button 111 is pressed with the display boxes of programs to be broadcast from 10:00 on channel "023ch" displayed, the display boxes of programs to be broadcast from 10:00 on channel "022ch" are displayed. Then, when the button 112 is pressed, the display boxes of programs to be broadcast from 10:00 on the representative channel "021ch" are displayed.

To be more specific, in the program guide shown in FIG. 7, programs taking the same value in X-axis ("10:00" in this example) and taking "021ch," "022ch," and "023ch" in Y-axis are displayed as stacked in Z-direction. Therefore, in this program guide, the values of Y-axis of these three programs ("021ch" through "023ch" in Y-axis value) are regarded to be virtually the same; therefore, different Z-axis values are allocated to these three programs.

Figure 8:
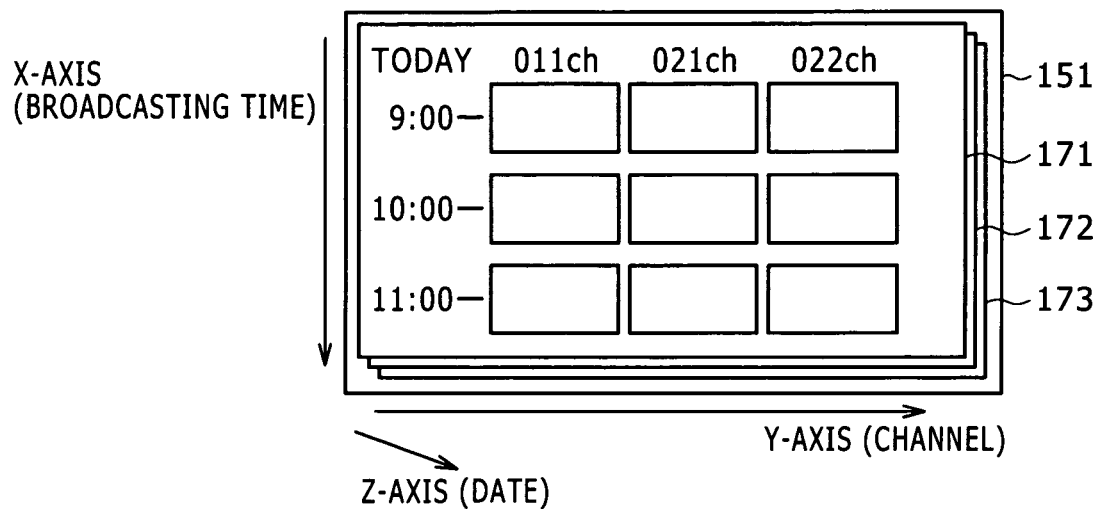
FIG. 8 is a diagram illustrating another exemplary display image of a screen to be displayed when a program guide is displayed in a three-dimensional manner.

Referring to FIG. 8, there is shown another display example in which a program guide is displayed in a three-dimensional manner. FIG. 8 shows an example in which program guides of different broadcasting days are displayed in a stacked manner.

In FIG. 8, the up and down direction is indicated by X-axis, the horizontal direction is indicated by Y-axis, and the depth direction (the direction perpendicular to the surface of screen) is indicated by Z-axis. In the example shown, X-axis is indicative of broadcasting time and Y-axis is indicative of broadcasting channel. Z-axis is indicative of broadcasting day.

As with the example shown in FIG. 7, display boxes of programs are shown on the screen 151 of FIG. 8. The screen 151 of FIG. 8 also displays a list 171 that is a list of programs to be broadcast today, a list 172 that is a list of programs to be broadcast tomorrow, and a list 173 that is a list of programs to be broadcast the day after tomorrow in the Z-axis direction as stacked.

In the state shown in FIG. 8, the user viewing the screen on the display block 27 can make a confirmation of the programs that are broadcast today. When the button 111 of the remote controller 100 is pressed in the state shown in FIG. 8, the display of the screen 151 is changed such that the list 172 is displayed on top of the list stack in Z-axis instead of the list 171. To be more specific, when the button 111 of the 100 is pressed in the state shown in FIG. 8, the user can make a confirmation of the programs to be broadcast tomorrow. When the button 111 of the remote controller 100 is further pressed in this state, the display of the screen 151 is changed such that the list 173 is displayed on top of the list stack in Z-axis instead of the list 172 and the user can make a confirmation of the programs to be broadcast the day after tomorrow.

If the button 112 of the remote controller 100 is pressed in the state in which the list 173 is shown on top of the list stack in Z-axis, the display of the screen 151 is changed such that the list 172 comes on top of the list stack in Z-axis instead of the list 173. When the button 112 of the remote controller 100 is pressed, the display of the screen 151 is changed such that the list switching control list 171 comes on top of the list stack in Z-axis instead of the list 172.

Namely, in the program guide shown in FIG. 8, the list 171 through the list 173 are allocated with different Z-axis values.

Figure 9:
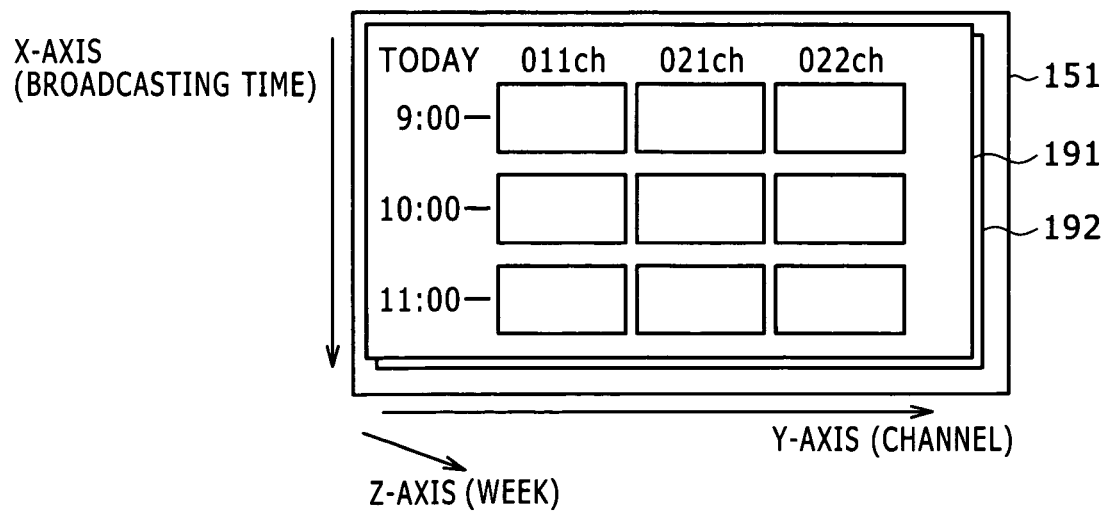
FIG. 9 is a diagram illustrating still another exemplary display image of a screen to be displayed when a program guide is displayed in a three-dimensional manner.

Referring to FIG. 9, there is shown still another display example in which a program guide is displayed in a three-dimensional manner. FIG. 8 shows an example in which program guides of different broadcasting weeks are displayed in a stacked manner.

In FIG. 9, the up and down direction is indicated by X-axis, the horizontal direction is indicated by Y-axis, and the depth direction (the direction perpendicular to the surface of screen) is indicated by Z-axis. In the example shown, X-axis is indicative of broadcasting time and Y-axis is indicative of broadcasting channel. Z-axis is indicative of broadcasting week.

The screen 151 shown in FIG. 9 shows display boxes of programs as with the example shown in FIG. 8. In FIG. 9, although not shown, scrolling down the screen 151 exposes the display boxes programs to be broadcast tomorrow and the day after tomorrow. To be more specific, a list 191 shown in FIG. 9 is a list programs to be broadcast in this week (for one week). The screen 151 shown in FIG. 9 also shows the list 191 that is a list of programs to be broadcast this week a list 192 that is a list of program to be broadcast next week (for one week) as stacked in the Z-axis direction.

In the state shown in FIG. 9, the user can make a confirmation of the programs to be broadcast this week. When the button 111 of the remote controller 100 is pressed in the state shown in FIG. 9, the display of the screen 151 is changed such that the list 192 comes on top of the list stack in Z-axis in stead of the list 191. Namely, when the button 111 of the remote controller 100 is pressed in the state shown in FIG. 9, the user can make a confirmation of the programs to be broadcast next week.

When the button 112 of the remote controller 100 is pressed in the state in which the list 192 is displayed on top of the list stack in Z-axis, the display of the screen 151 is changed such that the list 191 comes on top of the list stack instead of the list 192.

Namely, in the program guide shown in FIG. 9, the list 191 the list 192 are allocated with different Z-axis values.

As described above, in the embodiments of the present invention, two or more items of the information about programs are displayed as stacked on each two-dimensional screen and, every time the button 111 or the button 112 of the remote controller 100 is pressed, the position of an image in the depth direction (Z-axis) of the screen is changed, so that the user grasps a program guide as if the program guide is displayed in a three-dimensional manner. This provides the display of program guides that is easy to understand and operate for the user.

Figure 10:
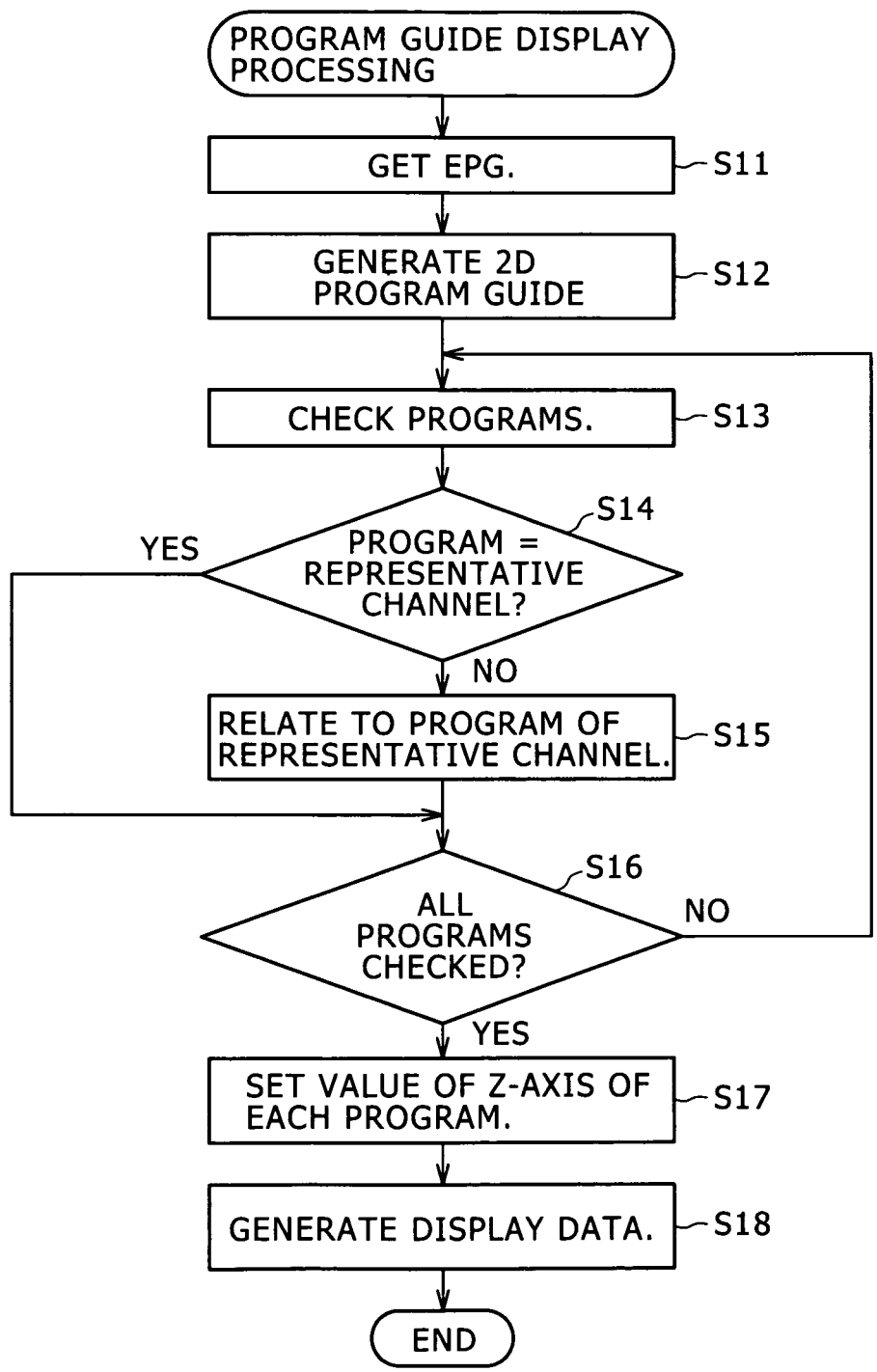
FIG. 10 is a flowchart indicative of an example of program guide display processing.

The following describes an example of program display processing that is executed by the content processing apparatus 10 with reference to a flowchart shown in FIG. 10. This processing is executed when a GUI displayed on a screen on the display block 27 is operated by the user through the remote controller 100 to display a program guide in the manner described with reference to FIG. 7 above, for example.

In step S11, the data capturing unit 71 shown in FIG. 5 gets EPG data.

In step S12, on the basis of the EPG data obtained in step S11, the processing executing unit 72 generates data for displaying a two-dimensional program guide in which X-axis is indicative of broadcasting time and Y-axis is indicative of broadcasting channel, for example.

In step S13, the analyzing unit 73 checks, one by one, the programs listed in the two-dimensional program guide generated in step S12. In this analysis, it is determined whether each program to be broadcast in a predetermined time zone on each channel is broadcast on a representative channel or a channel other than the representative channel.

In step S14, the analyzing unit 73 determines whether a particular program is one that is broadcast on the representative channel. If the program is found to be broadcast on the representative channel, then the procedure goes to step S16.

On the other hand, if the program is found in step to be not broadcast on the representative channel, then the procedure goes to step S15, in which the program is related to programs that are broadcast on the representative channel.

To be more specific, by the processes in step S14 and step S15, the programs to be broadcast on the representative channel and the programs to be broadcast on other channels in the same time zone are related with each other to be recognizable as one group.

In step S16, the analyzing unit 73 determines whether the programs listed in the two-dimensional program guide generated in step S12 have all been checked. If there remains any programs unchecked, the procedure returns to step to check these programs. Thus, until all programs have been checked in step S16, the processes of steps S13 through are repeated.

If all programs are found checked in step S16, then the procedure goes to step S17.

In step S17, the 3D display converting unit 74 sets a Z-axis value of each program. As described above, by the processes in step S14 and step S15, the programs to be broadcast on the representative channel and the programs to be broadcast on other channels in the same time zone were related with each other to be recognizable as one group. In step S17, Z-axis values are allocated; a value corresponding to the representative channel, a value corresponding to a first non-representative channel, a value corresponding to a second non-representative channel, and so on, in this group.

For example, assume that the representative channel of a certain broadcasting station be "021ch," non-representative channels be "022ch" and "023ch," and, as a result of processing of steps S11 through S16, program A be broadcast for one hour from 10:00 on channel "021ch," program B be broadcast for one hour from 10:00 on channel "022ch," and program C be broadcast for one hour from 10:00 on channel "023ch."

In this case, in step S17, a Z-axis value of program A is set to "0," a Z-axis value of program B is set to "01," and a Z-axis value of program C is set to "2," for example.

In step S18, on the basis of the Z-axis values set in step S17, the display data generating unit 75 generates again the display data of the two-dimensional program guide generated in step S12, as the display data of a corresponding three-dimensional program guide.

The program guide display processing is executed as described above.

Thus, as described with reference to FIG. 7, the program on the representative channel and the programs on the non-representative channels of the same broadcasting station that are broadcast in the same time zone can be displayed in a superimposed manner. It should be noted that the example shown in FIG. 7 is indicative that, if any of the programs on non-representative channels are the same as the program that is broadcast on the representative channel in that time zone, the programs on the non-representative channels are not displayed on the program guide and only the program on the representative channel is displayed.

Figure 11:
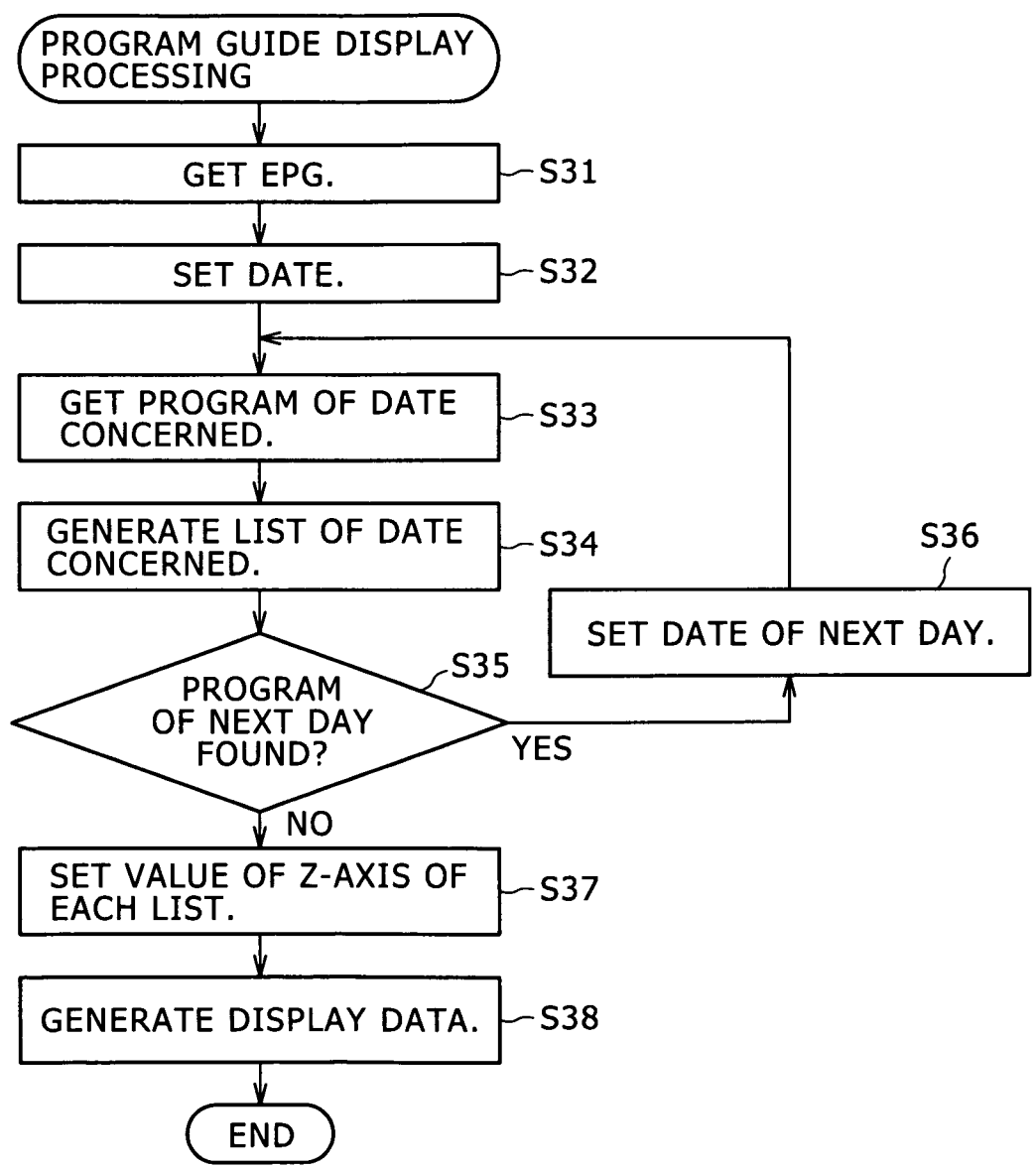
FIG. 11 is a flowchart indicative of another example of program guide display processing.

The following describes another example of program guide display processing to be executed by the content processing apparatus 10 with reference to a flowchart shown in FIG. 11. This processing is executed when the user operates a GUI displayed on a screen on the display block 27 through the remote controller 100, for example, to issue a command for displaying a program guide in a manner as described above with reference to FIG. 8.

In step S31, the data capturing unit 71 shown in FIG. 5 gets EPG data.

In step S32, the processing executing unit 72 sets date. The date to be set is today (the day on which the processing is executed), for example.

In step S33, on the basis of the EPG data obtained in step S31, the processing executing unit 72 and the analyzing unit 73 get programs to be broadcast on the day set in step S32. It should be noted that, at the same time, processing necessary for the creation of a program guide is executed, starting the generating of data for displaying a two-dimensional program guide with X-axis indicative of broadcasting time and Y-axis indicative of broadcasting channel, for example.

In step S34, the processing executing unit 72 generates display data for displaying a list of programs to be broadcast on the day set in step S32. This list provides a two-dimensional program guide with X-axis indicative of broadcasting time and Y-axis indicative of broadcasting channel, for example.

In step S35, the analyzing unit 73 determines whether there is any program that is broadcast on the day after the day set in step S32. If any program that is broadcast on the day after the specified day is found, the procedure goes to step S36, in which the date of the next day is set, upon which the procedure returns to step S33.

Next, the process of step S34 is executed again to generate display data for displaying a list of programs to be broadcast on the day after the day set in step S32.

If no program to be broadcast on the day after the day set in step S32 or S36 is found in step S35, then the procedure goes to step S37.

In step S37, the 3D display converting unit 74 sets a Z-axis value of each list. As described above, the list of the programs to be broadcast on the same day was generated by the process of step S34. In step S37, a Z-axis value is allocated to each list; a value corresponding to the list of programs to be broadcast today, a value corresponding to the list of programs to be broadcast tomorrow, and so on.

For example, assume that list A of programs to be broadcast today and list B of programs to be broadcast tomorrow were generated beforehand. In this case, in step S37, a Z-axis value of list A is set to "0" and a Z-axis value of list B is set to "1," for example.

In step S38, on the basis of the Z-axis values set in step S37, the display data generating unit 75 generates again the two-dimensional program guide display data generated in step S34, as the display data for a three-dimensional program guide.

As described above, the program guide display processing is executed.

Thus, as described above with reference to FIG. 8 for example, the program guides of different broadcasting days (dates) are displayed in a superimposed manner.

In the above, the examples have been described in which mainly program guides are displayed in three-dimensional manners. It is also practicable with the present invention to display content search results, a list of timer-viewing or timer-recording, and so on in three-dimensional manners.

Figure 12:
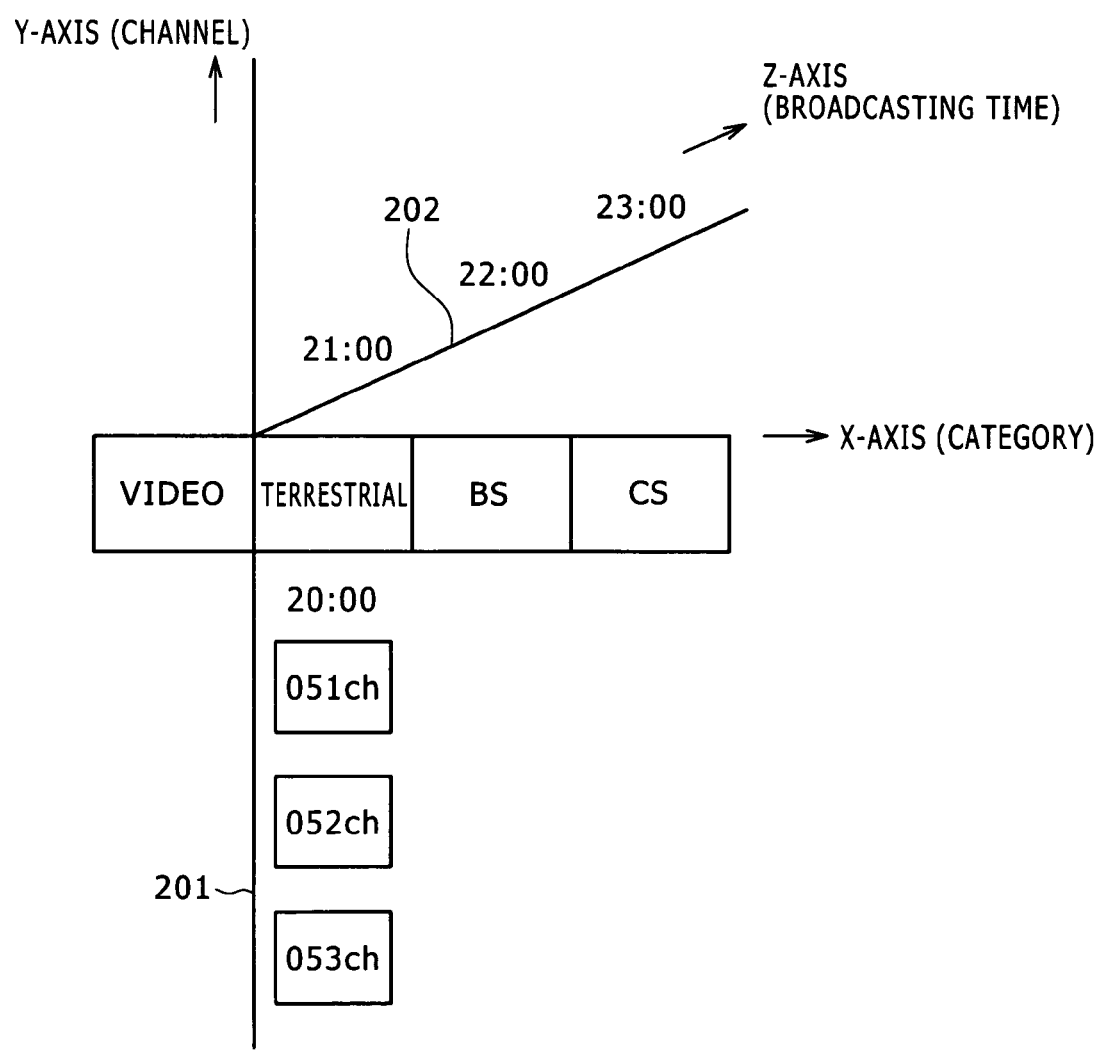
FIG. 12 is a diagram illustrating an exemplary display image of a screen to be displayed when a GUI is displayed in a three-dimensional manner.

Further, a predetermined GUI and so on can be displayed in a three-dimensional manner. FIG. 12 shows a display example of a screen on which a GUI for letting content be selected by category in a three-dimensional manner. In this example, X-axis is indicative of category, Y-axis is indicative of channel, and Z-axis is indicative of broadcasting time.

Herein, term "category" denotes "video" indicative of recorded content, "terrestrial" indicative of a program that is broadcast on terrestrial wave, "BS" and "CS" indicative of programs that are broadcast by satellite broadcasting, for example.

In the GUI shown in FIG. 12, it is assumed that the current time be 20:00. It should be noted that the current time is displayed at the position of value "0" on Z-axis. Currently, programs to be broadcast by terrestrial wave are displayed in a column in FIG. 12. It should be noted that "051ch" in a box is indicative of a program display box for displaying the title for example of a program currently being broadcast on channel "051ch," "052ch" in a box is indicative of a program display box for displaying the title for example of a program currently being broadcast on channel "052ch," and "053ch" in a box is indicative of a program display box for displaying the title for example of a program currently being broadcast on channel "053ch."

For example, when the cursor is moved downward by operating the corresponding button arranged on the area 100b of the remote controller 100, an axis 202 corresponding to Z-axis also is moved downward. Then, the position of channels along Y-axis are also moved; for example, the display boxes of programs to be broadcast on terrestrial channels "061ch" through "063ch" come to be displayed on the screen. At this moment, the display boxes of programs to be broadcast on channels "051ch" through "053ch" disappear.

Also, for example, when the cursor is moved to the right in the figure by operating the corresponding button arranged on the 100b of the remote controller 100, the display of an axis 201 corresponding to Y-axis and the display of an axis 202 corresponding to Z-axis are moved to the right in the figure. Then, the display box of a program currently being broadcast on a predetermined channel of satellite broadcasting "BS" is displayed on the screen. At this moment, the display boxes of the programs to be broadcast on channels "051ch" through "053ch" disappear.

Further, when the cursor is moved into the depth of the figure by operating the button 111 of the remote controller 100, the current time displayed at the position of value "0" of Z-axis is changed to "21:00." Then, the display boxes of the programs to be broadcast on terrestrial channels "051ch" through "053ch" are displayed on the screen.

Thus, the user can set category, channel, and broadcasting time as desired to select desired content.

In addition, the items indicated by X-axis, Y-axis, and Z-axis may be changed. For example, by simultaneously pressing the corresponding button on the 100b of the remote controller 100 and the button 111 or the button 112, the GUI screen shown in FIG. 12 may be displayed as if the GUI screen is rotated, resulting in X-axis being broadcasting time, Y-axis being channel, and Z-axis being category.

The above-mentioned configuration provides an easier-to-use GUI.

The above-mentioned sequence of processing operations may be executed by software as well as hardware. When the above-mentioned sequence of processing operations is executed by software, the programs constituting the software are installed in a computer which is built in dedicated hardware equipment or installed, from a network or recording media, into a general-purpose personal computer 700 as shown in FIG. 13 for example in which various programs may be installed for the execution of various functions.

Figure 13:
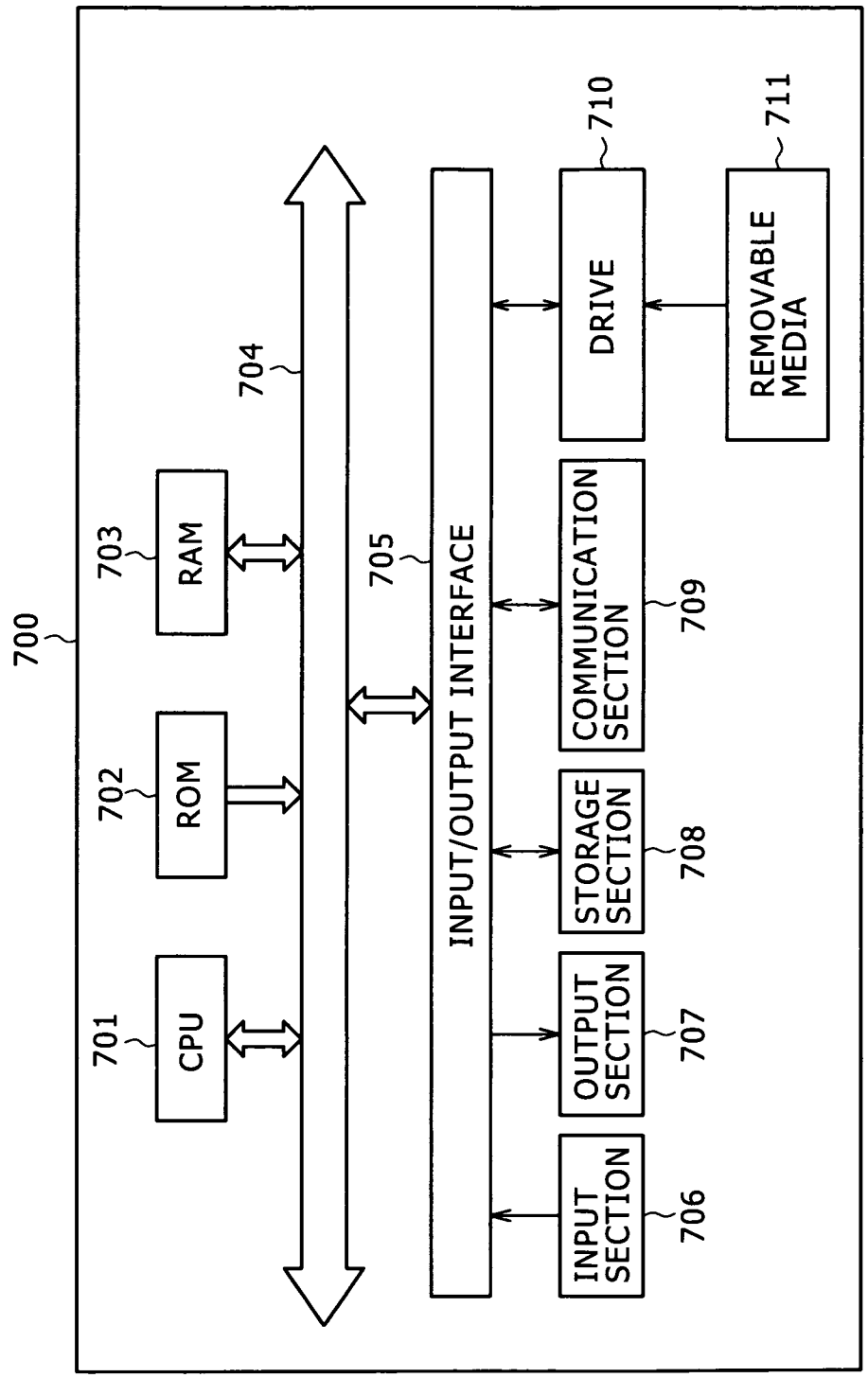
FIG. 13 is a block diagram illustrating an exemplary configuration of a personal computer.

In FIG. 13, A CPU (Central Processing Unit) 701 executes various processing operations as instructed by a program stored in a ROM (Read Only Memory) 702 or a program loaded from a storage section 708 into a RAM (Random Access Memory). The RAM 703 also stores, from time to time, data and so on that are necessary for the CPU 701 to execute various processing operations.

The CPU 701, the ROM 702, and the RAM 703 are interconnected via a bus 704. This bus 704 is also connected to an input/output interface 705.

The input/output interface 705 is connected with an input section 706 made up of a keyboard and a mouse for example, an output section 707 made up of a display device based on CRT (Cathode Ray Tube) or LCD (Liquid Crystal Display) and a loudspeaker for example, a storage section 708 made up of hard disk, and a communication section 709 made up of a modem and a network interface card such as a LAN card for example. The communication section 709 is configured to execute communication processing via a network including the Internet, for example.

The input/output interface 705 is also connected with a drive 710 as required, on which a removable media 711, such as a magnetic disk, an optical disk, a magneto-optical disk, or a semiconductor memory, is loaded as required. From the loaded removable media 711, a computer program is read to be installed in the storage section 708.

If the above-mentioned sequence of processing operations are executed by software, programs constituting this software are installed from a network, such as the Internet, or recording media made up of the removable media 711.

The above-mentioned recording medium is configured not only by the removable medium 711 such as a magnetic disc (including a flexible disc), an optical disc (including CD-ROM (Compact Disc Read Only Memory), DVD (Digital Versatile Disc), a magneto-optical disc (including MD (Mini Disc) (trademark)), or a semiconductor memory recorded with programs for distribution of programs to users separately from the apparatus main, but also by the ROM 702 recorded with programs and a hard disc drive recorded with programs and included in the storage section 708 that are provided to users as incorporated in the apparatus main as shown in FIG. 13.

It should be noted herein that the steps for describing each program recorded in recording media include not only the processing operations which are sequentially executed in a time-dependent manner but also the processing operations which are executed concurrently or discretely.

It should be understood by those skilled in the art that various modifications, combinations, sub-combinations and alterations may occur depending on design requirements and other factors insofar as they are within the scope of the appended claims or the equivalents thereof.

What is claimed is:

1. A display control apparatus configured to execute control such that a list of a plurality of programs is displayed, comprising:

data capturing means for capturing data including information about a program to be displayed;

two-dimensional arranging means for arranging said plurality of programs on two dimensions on the basis of data captured by said data capturing means;

setting means for setting a third axis different from two axes constituting said two dimensions;

superimposed-display control means for generating display data for displaying information about programs, among said plurality of programs arranged by said two-dimensional arranging means, with each of which a value corresponding to one of said two axes constituting said two dimensions is substantially identical to a corresponding value of another of said programs and a value corresponding to the other of said two axes satisfies a predetermined condition, said programs being displayed in a superimposed manner as a stack along the different third axis set by said setting means; and operating means for changing a display position in a depth direction away from a user along the different third axis on a screen on which said programs are displayed in the superimposed manner as a stack, such that, when an input to change the display position in the depth direction on the screen is entered in a first state in which only information about a first program, among the programs displayed in the superimposed manner, at the top of the stack is viewable by a user, in response to the input information about another program, among the programs displayed in the superimposed manner, adjacent in the depth direction to the first program is displayed at the top of the stack instead of the information of the first program in a second state in which only the information about the another program of the programs displayed in the superimposed manner is viewable by the user, wherein, when changing the display position of the programs being displayed on the screen in the superimposed manner as the stack in response to the input entered in the first state to obtain the second state, only information about a program, among the programs displayed in the superimposed manner, at the top of the stack is viewable by the user and, in each of the first state and the second state, each program displayed in the stack which is other than the program displayed at the top of the stack is arranged in a same axial alignment in the depth direction along the different third axis from the program displayed at the top of the stack.

2. The display control apparatus according to claim 1, wherein one of said two axes constituting said two dimensions is indicative of a broadcasting station while the other is indicative of a broadcasting time and said superimposed-display control means generates display data for displaying a program to be broadcast on a representative channel and programs to be broadcast on non-representative channels of a same broadcasting station at a same broadcasting time onto a screen in a superimposed manner.

3. The display control apparatus according to claim 1, wherein one of said two axes of said two dimensions is indicative of a channel while the other is indicative of a broadcasting time and said superimposed-display control means generates display data for displaying a program to be broadcast on a predetermined day and programs to be broadcast on different days on a same channel onto a screen in a superimposed manner.

4. The display control apparatus according to claim 1, wherein
one of said two axes of said two dimensions is indicative of a channel while the other is indicative of a broadcasting time and
said superimposed-display control means generates display data for displaying a program to be broadcast in a predetermined week and programs to be broadcast in different weeks on a same channel onto a screen in a superimposed manner.

5. A display method configured to display a list of a plurality of programs onto a display screen, comprising the steps of:
capturing data including information about a program to be displayed;
arranging said plurality of programs on two dimensions on the basis of captured data;
setting a third axis different from two axes constituting said two dimensions;
generating, by a processor, display data for displaying information about programs, among said plurality of programs arranged by said two-dimensional arranging step, with each of which a value corresponding to one of said two axes constituting said two dimensions is substantially identical to a corresponding value of another of said programs and a value corresponding to the other of said two axes satisfies a predetermined condition, said programs being displayed in a superimposed manner as a stack along said set different third axis; and
changing a display position in a depth direction away from a user along the different third axis on a screen on which said programs are displayed in the superimposed manner as a stack, such that, when an input to change the display position in the depth direction on the screen is entered in a first state in which only information about a first program, among the programs displayed in the superimposed manner, at the top of the stack is viewable by a user, in response to the input information about another program, among the programs displayed in the superimposed manner, adjacent in the depth direction to the first program is displayed at the top of the stack instead of the information of the first program in a second state in which only the information about the another program of the programs I displayed in the superimposed manner is viewable by the user,
wherein, when changing the display position of the programs being displayed on the screen in the superimposed manner as the stack in response to the input entered in the first state to obtain the second state, only information about a program, among the programs displayed in the superimposed manner, at the top of the stack is viewable by the user and, in each of the first state and the second state, each program displayed in the stack which is other than the program displayed at the top of the stack is arranged in a same axial alignment in the depth direction along the different third axis from the program displayed at the top of the stack.

6. A non-transitory recording media recording a program for making a computer be executed as a display control apparatus configured to execute control such that a list of a plurality of programs is displayed, said program comprising the steps of:
capturing data including information about a program to be displayed;
arranging said plurality of programs on two dimensions on the basis of captured data;
setting a third axis different from two axes constituting said two dimensions;
generating display data for displaying information about programs, among said plurality of programs arranged by said two-dimensional arranging step, with each of which a value corresponding to one of said two axes constituting said two dimensions is substantially identical to a corresponding value of another of said programs and a value corresponding to the other of said two axes satisfies a predetermined condition, said programs being displayed in a superimposed manner as a stack along said set different third axis; and
changing a display position in a depth direction away from a user along the different third axis on a screen on which said programs are displayed in the superimposed manner as a stack, such that, when an input to change the display position in the depth direction on the screen is entered in a first state in which only information about a first program, among the programs displayed in the superimposed manner, at the top of the stack is viewable by a user, in response to the input information about another program, among the programs displayed in the superimposed manner, adjacent in the depth direction to the first program is displayed at the top of the stack instead of the information of the first program in a second state in which only the information about the another program of the programs I displayed in the superimposed manner is viewable by the user,
wherein, when changing the display position of the programs being displayed on the screen in the superimposed manner as the stack in response to the input entered in the first state to obtain the second state, only information about a program, among the programs displayed in the superimposed manner, at the top of the stack is viewable by the user and, in each of the first state and the second state, each program displayed in the stack which is other than the program displayed at the top of the stack is arranged in a same axial alignment in the depth direction along the different third axis from the program displayed at the top of the stack.

7. A display control apparatus configured to execute control such that a list of a plurality of programs is displayed, comprising:
a data capturer configured to capture data including information about a program to be displayed;
a two-dimensional arranger configured to arrange said plurality of programs on two dimensions on the basis of data captured by said data capturer;
a setter configured to set a third axis different from two axes constituting said two dimensions;
a superimposed-display controller configured to generate display data for displaying information about programs, among said plurality of programs arranged by said two-dimensional arranger, with each of which a value corresponding to one of said two axes constituting said two dimensions is substantially identical to a corresponding value of another of said programs and a value corresponding to the other of said two axes satisfies a predetermined condition, said information about programs being displayed in a superimposed manner as a stack along the different third axis set by said setter; and
an operating unit to change a display position in a depth direction away from a user along the different third axis on a screen on which said programs are displayed in the superimposed manner as a stack, such that, when an input to change the display position in the depth direction on the screen is entered in a first state in which only information about a first program, among the programs displayed in the superimposed manner, at the top of the stack is viewable by a user, in response to the input information about another program, among the programs displayed in the superimposed manner, adjacent in the depth direction to the first program is displayed at the top of the stack instead of the information of the first program in a second state in which only the information about the another program of the programs displayed in the superimposed manner is viewable by the user,
wherein, when changing the display position of the programs being displayed on the screen in the superimposed manner as the stack in response to the input entered in the first state to obtain the second state, only information about a program, among the programs displayed in the superimposed manner, at a top of the stack is viewable by the user and, in each of the first state and the second state, each program displayed in the stack which is other than the program displayed at the top of the stack is arranged in a same axial alignment in the depth direction along the different third axis from the program displayed at the top of the stack.

* * * * *